United States Patent
Avron et al.

(10) Patent No.: US 11,979,309 B2
(45) Date of Patent: May 7, 2024

(54) SYSTEM AND METHOD FOR DISCOVERING AD-HOC COMMUNITIES OVER LARGE-SCALE IMPLICIT NETWORKS BY WAVE RELAXATION

(71) Applicant: International Business Machines Corporation, Armonk, NY (US)

(72) Inventors: Haim Avron, White Plains, NY (US); Lior Horesh, North Salem, NY (US); Raya Horesh, North Salem, NY (US); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 14/954,633

(22) Filed: Nov. 30, 2015

(65) Prior Publication Data
US 2017/0155571 A1    Jun. 1, 2017

(51) Int. Cl.
H04L 45/02    (2022.01)

(52) U.S. Cl.
CPC .................................. H04L 45/02 (2013.01)

(58) Field of Classification Search
CPC .... G06Q 50/01; G06Q 30/02; G06Q 30/0201; G06Q 30/0244; G06Q 30/0254; G06Q 10/06; G06Q 10/067; G06Q 30/0267; G06Q 30/0269; G06Q 30/0251; G06Q 30/0241; G06Q 30/0277; G06Q 10/063; G06Q 30/0242; G06Q 30/0631; G06F 17/30876; G06F 17/30038; G06F 17/30371; G06F 16/9024; G06F 16/24578; G06F 16/9535; G06F 16/2455; G06F 16/285; G06F 16/3334; G06F 16/35; G06F 16/367;
(Continued)

(56) References Cited

U.S. PATENT DOCUMENTS 7,644,146 B2    1/2010  Huberman et al.
8,312,056 B1 *  11/2012  Peng ...................... G06Q 50/01
                                                    705/319
(Continued)

FOREIGN PATENT DOCUMENTS

| WO | WO-2006034222 A2 * | 3/2006 | ......... G06F 17/3061 |
| WO | WO-2006121575 A2 * | 11/2006 | ............. G06Q 10/00 |
| WO | WO-2014159540 A1 * | 10/2014 | ............... G06N 5/04 |

OTHER PUBLICATIONS

Andersen et al.; Local Graph Partitioning Using PageRank Vectors; 2006; IEEE; Proceedings of the 47th Annual IEEE Symposium on Foundations of Computer Science; pp. 1-9 (Year: 2006).*

(Continued)

Primary Examiner — Tonia L Dollinger
Assistant Examiner — Linh T. Nguyen
(74) Attorney, Agent, or Firm — Daniel Morris; McGinn I.P. Law Group, PLLC

(57) ABSTRACT

A method includes computing a diffusion vector starting with a seed, querying nodes for connections, reweighting diffusion vector based on the degrees, sorting nodes based upon magnitude in the reweighted diffusion vector which is obtained through wave relaxation solution of a time-dependent initial value problem, detecting a community through a sweep over the nodes according to their rank, and selecting a prefix that minimizes or maximizes an objective function.

18 Claims, 8 Drawing Sheets

(58) Field of Classification Search
CPC .... G06F 16/95; G06F 2221/2111; G06F 8/34; G06F 9/4488; G06F 16/951; G06F 9/5061; G06F 16/1834; G06F 16/9038; H04L 65/403; H04L 51/32; H04L 45/46; H04L 67/1044; H04L 67/22; H04L 67/306; H04L 67/1072; H04L 45/02; H04W 4/21; H04W 8/005; H04W 40/246; H04W 4/029; H04W 64/003
USPC ........ 709/204, 205; 707/736, 737, 740, 748, 707/752, 798, 999.1
See application file for complete search history.

(56) References Cited

U.S. PATENT DOCUMENTS

| | | | |
|---|---|---|---|
| 8,363,570 | B2 | 1/2013 | Mukherjea et al. |
| 8,370,313 | B2 | 2/2013 | Snow |
| 8,375,024 | B2* | 2/2013 | Goeldi .................. G06Q 30/00 709/224 |
| 8,396,855 | B2 | 3/2013 | Aggarwal et al. |
| 8,856,252 | B2* | 10/2014 | Leppanen ............. H04W 8/005 370/328 |
| 9,009,147 | B2* | 4/2015 | He ...................... G06F 16/9024 707/728 |
| 10,127,596 | B1* | 11/2018 | Franke ............... G06Q 30/0631 |
| 2003/0167324 | A1* | 9/2003 | Farnham ............. G06Q 10/10 709/224 |
| 2006/0218107 | A1* | 9/2006 | Young ................. G05B 13/027 706/13 |
| 2006/0271564 | A1* | 11/2006 | Meng Muntz ............ G06F 7/00 |
| 2007/0260725 | A1* | 11/2007 | McCuller .............. G06Q 50/10 709/224 |
| 2008/0052263 | A1* | 2/2008 | Andersen ............. G06F 16/954 |
| 2009/0171994 | A1* | 7/2009 | Sprangle .............. G06F 9/3867 |
| 2010/0063973 | A1* | 3/2010 | Cao .................. G06F 17/30477 707/758 |
| 2010/0332312 | A1* | 12/2010 | Klinger ................. G06Q 10/10 705/14.43 |
| 2012/0197988 | A1 | 8/2012 | Leppanen et al. |
| 2012/0303573 | A1* | 11/2012 | Pan ........................ G06N 7/005 706/52 |
| 2012/0324027 | A1* | 12/2012 | Vaynblat ............... G06Q 50/01 709/206 |
| 2013/0041860 | A1* | 2/2013 | Lawrence .............. G06N 20/00 706/46 |
| 2013/0132442 | A1* | 5/2013 | Tsatsou ................ G06F 16/367 707/E17.011 |
| 2013/0150086 | A1* | 6/2013 | Caralis ............... G06Q 30/0631 455/456.3 |
| 2013/0339290 | A1* | 12/2013 | Lee ........................ G06F 17/10 706/55 |
| 2014/0012558 | A1* | 1/2014 | Mansi .................... G16H 50/50 703/11 |
| 2014/0058754 | A1* | 2/2014 | Wild ...................... G16H 80/00 705/3 |
| 2014/0244664 | A1* | 8/2014 | Verma ................ G06Q 30/0251 707/749 |
| 2014/0267301 | A1* | 9/2014 | Yang et al. .............. G09G 5/04 345/467 |
| 2014/0269514 | A1 | 9/2014 | Leppanen et al. |
| 2014/0280224 | A1* | 9/2014 | Feinberg ............. G06F 16/9024 707/748 |
| 2014/0282574 | A1* | 9/2014 | Marathe ................ G06F 9/4881 718/103 |
| 2014/0304270 | A1* | 10/2014 | Torkamani ............. G16B 50/00 702/19 |
| 2014/0337356 | A1 | 11/2014 | Barbieri et al. |
| 2015/0026105 | A1* | 1/2015 | Henrichsen ........ G06Q 30/0273 706/12 |
| 2015/0026151 | A1* | 1/2015 | Fujita .................. G06F 16/9024 707/708 |
| 2015/0039613 | A1* | 2/2015 | Li ....................... G06F 16/9024 707/737 |
| 2015/0120717 | A1* | 4/2015 | Kim .................. G06F 17/30699 707/727 |
| 2015/0135329 | A1* | 5/2015 | Aghasaryan .......... H04L 67/306 726/26 |
| 2015/0149469 | A1* | 5/2015 | Xu et al. .................. G06F 17/30 707/740 |
| 2015/0188783 | A1 | 7/2015 | Shivashankar et al. |
| 2015/0195286 | A1* | 7/2015 | Doppler ................ H04L 67/125 726/4 |
| 2015/0220639 | A1* | 8/2015 | Lawyer ............... G06F 16/9024 707/728 |
| 2015/0278346 | A1* | 10/2015 | Aiello ................. G06F 16/3334 707/798 |
| 2015/0312744 | A1* | 10/2015 | Leppanen ............. H04W 48/08 370/338 |
| 2015/0379525 | A1* | 12/2015 | Ananthanarayanan ...................... G06Q 30/0201 705/7.29 |
| 2016/0117604 | A1* | 4/2016 | Frosst ...................... G06N 5/02 706/12 |
| 2016/0140601 | A1* | 5/2016 | Blackhurst ......... G06Q 30/0244 705/14.43 |
| 2016/0212163 | A1* | 7/2016 | Louni .................. G06F 16/9024 |
| 2016/0246919 | A1* | 8/2016 | Wang ..................... G06Q 50/22 |
| 2016/0378774 | A1* | 12/2016 | Apreleva .............. H04L 51/222 707/750 |
| 2016/0381154 | A1* | 12/2016 | Apreleva ................ H04L 67/18 709/205 |
| 2017/0039305 | A1* | 2/2017 | Shakarian ............. G06Q 10/10 |
| 2017/0091319 | A1* | 3/2017 | Legrand ............. G06F 16/3346 |
| 2017/0154307 | A1* | 6/2017 | Maurya ............... G06F 16/9535 |

OTHER PUBLICATIONS

Dang et al.; Collaborative Filtering in Social Network: A Community-based Approach; 2013; IEEE; pp. 1-6 (Year: 2013).*
Campbell et al.; Social Network Analysis with Content and Graphs; 12013; Lincoln Laboratory Journal; vol. 20, No. 1; pp. 62-81 (Year: 2013).*
Santo Fortunato; Community Detection in Graph; Jan. 25, 2010; pp. 1-130 (Year: 2010).*
He et al. (Detecting Overlapping Communities from Local Spectral Subspaces, 2015 IEEE International Conference on Data Mining, Sep. 27, 2014, pp. 1-11) (Year: 2014).*
Du et al.; Community Detection in Large-scale Social Networks; Aug. 12, 2007; WebKDD and SNA-KDD Workshop '07'; pp. 1-10 (Year: 2007).*
Gleich et al. , Using Local Spectral Methods to Robustify Graph-Based Learning Algorithms, KDD'15: Proceedings of the 21th ACM SIGKDD International Conference on Knowledge Discovery and Data Mining, Aug. 2015; pp. 359-368. (Year: 2015).*
Nettleton, Data Mining of Social Networks Represented as Graphs; Computer Science Review 7; 2013; pp. 1-34. (Year: 2012).*
Colbaugh et al.; Early warning analysis for social diffusion events; 2012; Colbaugh and Glass Security Informatics 2012, 1:18; 1-26 (Year: 2012).*
Andrea Kappes; Engineering Graph Clustering Algorithms; Apr. 28, 2015; 1-199 (Year: 2015).*
Using Local Spectral Methods to Robustify Graph-Based Learning Algorithms, KDD' 15: Proceedings of the 21th ACM SIGKDD International Conference on Knowledge Discovery and Data Mining— Aug. 2015—pp. 359-368) (Year: 2015).*
Kloster et al., Personalized PageRank Solution Paths, Mar. 1, 2015, arXiv:1503.00322, pp. 11 (Year: 2015).*
Campbell et al., Social Network Analysis with Content and Graphs, Lincoln Laboratory Journal, vol. 20, No. 1, pp. 1-20 (Year: 2013).*
Chen et al., Detecting Overlapping Temporal Community Structure in Time-Evolving Networks, pp. 1-12 (Year: 2013).*
Kloster et al. Personalized PageRank Solution Paths, pp. 1-11 (Year: 2015).*
Li et al. Overlapping Community Detection via Local Spectral Clustering; arXiv; p. 34 (Year: 2015).*
Ferry et al. Community Detection and Tracking on Networks from a Data Fusion Perspective; arXiv; p. 40 (Year: 2012).*

(56) References Cited

OTHER PUBLICATIONS

Wang et al.; Ttl: Neighborhood-based dynamic community detection with graph transform for 0-1 observed networks; Conf. Ttl: 19th International Computing and Combinatorics Conference, COCOON 2013; 2013; Publisher: Springer Verlag; Country of Publication: Germany; ISBN: 9783642387678; Database: Ei Compendex(R).

* cited by examiner

* $\|\alpha \sum_{j=1}^{n} P_{ij} y_j(\cdot) + (1-\alpha)(s)_i - y_i(\cdot) - y_i'(\cdot)\|_\infty \geq \frac{(1-\alpha)d_i \epsilon}{1-\exp((\alpha-1)\gamma)}$

** $y_i'(t) = -y_i(t) + \alpha \sum_{j=1} P_{ij} y_j(t) + (1-\alpha)s_i, \; y_i(0) = s_i$

SYSTEM AND METHOD FOR DISCOVERING AD-HOC COMMUNITIES OVER LARGE-SCALE IMPLICIT NETWORKS BY WAVE RELAXATION

This invention was made with Government support under Contract No.: FA8750-12-C-0323 awarded by Defense Advanced Research Projects Agency (DARPA). The Government has certain rights in this invention.

BACKGROUND OF THE INVENTION

Field of the Invention

The disclosed invention relates generally to a system and method for discovering ad-hoc communities, and more particularly, but not by way of limitation, relating to a system and method for discovering ad-hoc communities over large-scale implicit networks by wave relaxation.

Description of the Related Art

In community detection problems (i.e., graph clustering problems), one seeks to identify sets of nodes in a graph that are both internally cohesive and well separated from the rest of the graph. Such sets are then referred to as communities or clusters. In one important variant, the goal is to build a community around a given seed node or set of seed nodes. That is, the algorithm is given, as an input, a node (or nodes) in the graph, and the goal is to find a cluster in which it is a member.

In enterprise settings, one can identify communities of various attributes. For example, communities may be defined based upon level of interaction or shared attributes, such as skills, geography, project allocation, software use, security and access attributes, interests, years of experience, etc. In addition, corporate actions often require identification of communities with steerable levels of specificity (e.g. target a salary raise for workers possessing or relating to a specific skill). Corporate operation is dynamic in its needs, and the underlying network topology evolves and changes over time, and the communities with-in are being formed and dissolved continuously.

Thus, there is a need to form ad-hoc communities on a network that is implicit and discovered on the fly. To enable effective orchestration of enterprise operations there is a need to detect efficiently localized ad-hoc communities on large implicit network that are dynamically discovered, coupled with the ability to steer the scale and diffusivity (tightness) of these communities.

SUMMARY OF INVENTION

In view of the foregoing and other problems, disadvantages, and drawbacks of the aforementioned background art, an exemplary aspect of the disclosed invention provides a system and method for discovering ad-hoc communities over large-scale implicit networks by wave relaxation.

One example aspect of the disclosed invention provides method includes computing a diffusion vector starting with a seed, querying nodes for connections, reweighting diffusion vector based on the degrees, sorting nodes based upon magnitude in the reweighted diffusion vector, detecting a community through a sweep over the nodes according to their rank, and selecting a prefix that minimizes or maximizes an objective function.

The community is detected using a wave relaxation algorithm. The method can further include ranking association between web-pages, associates, or social media type applications. The method can further include integrating with a recommender system, if several members have an overlapping set of attributes, for a set of skills relevant to a predetermined membership. The diffusion vector is determined through a predetermined initial value problem, and the diffusion vector is locally determined. A seed vector initializes a diffusion vector. The method can further include discovering ad-hoc communities over implicit networks by wave relaxation.

Another aspect of the example embodiment includes a system, including a server including a processor, and a computer readable medium storing a program executed by the processor, wherein the server computes a diffusion vector starting with a seed, wherein the server querying nodes for connections, wherein the server reweights the diffusion vector based on the degrees, wherein the server sorts nodes based upon magnitude in the reweighted diffusion vector, wherein the server detects a community through a sweep over the nodes according to their rank, and wherein the server selects a prefix that minimizes or maximizes an objective function The community is detected using a wave relaxation algorithm. The server ranks association between web-pages, associates, or social media type applications. The server can integrate with a recommender system, if several members have an overlapping set of attributes, for a set of skills relevant to a predetermined membership. The diffusion vector is determined by the server through a predetermined initial value problem, and wherein the diffusion vector is locally determined within the server. A seed vector initializes a diffusion vector by the server. The server discovers ad-hoc communities over implicit networks by wave relaxation. The server can be in a cloud-based implementation.

In yet another example aspect of the disclosed invention, there is a server, including a processor, and a computer readable medium storing a program executed by the processor, wherein the server computes a diffusion vector starting with a seed, wherein the processor querying nodes for connections, wherein the processor reweights the diffusion vector based on the degrees, wherein the processor sorts nodes based upon magnitude in the reweighted diffusion vector, wherein the processor detects a community through a sweep over the nodes according to their rank, and wherein the processor selects a prefix that minimizes or maximizes an objective function.

The community is detected by the processor using a wave relaxation algorithm. The processor ranks association between web-pages, associates, or social media type applications. The processor integrates with a recommender system, if several members have an overlapping set of attributes, for a set of skills relevant to a predetermined membership, wherein the diffusion vector is determined by the processor through a predetermined initial value problem, and wherein the diffusion vector is locally determined within the server. The server discovers ad-hoc communities over implicit networks by wave relaxation, and wherein the server comprises a cloud-based implementation.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

DETAILED DESCRIPTION OF A PREFERRED EMBODIMENTS

Figure 1:
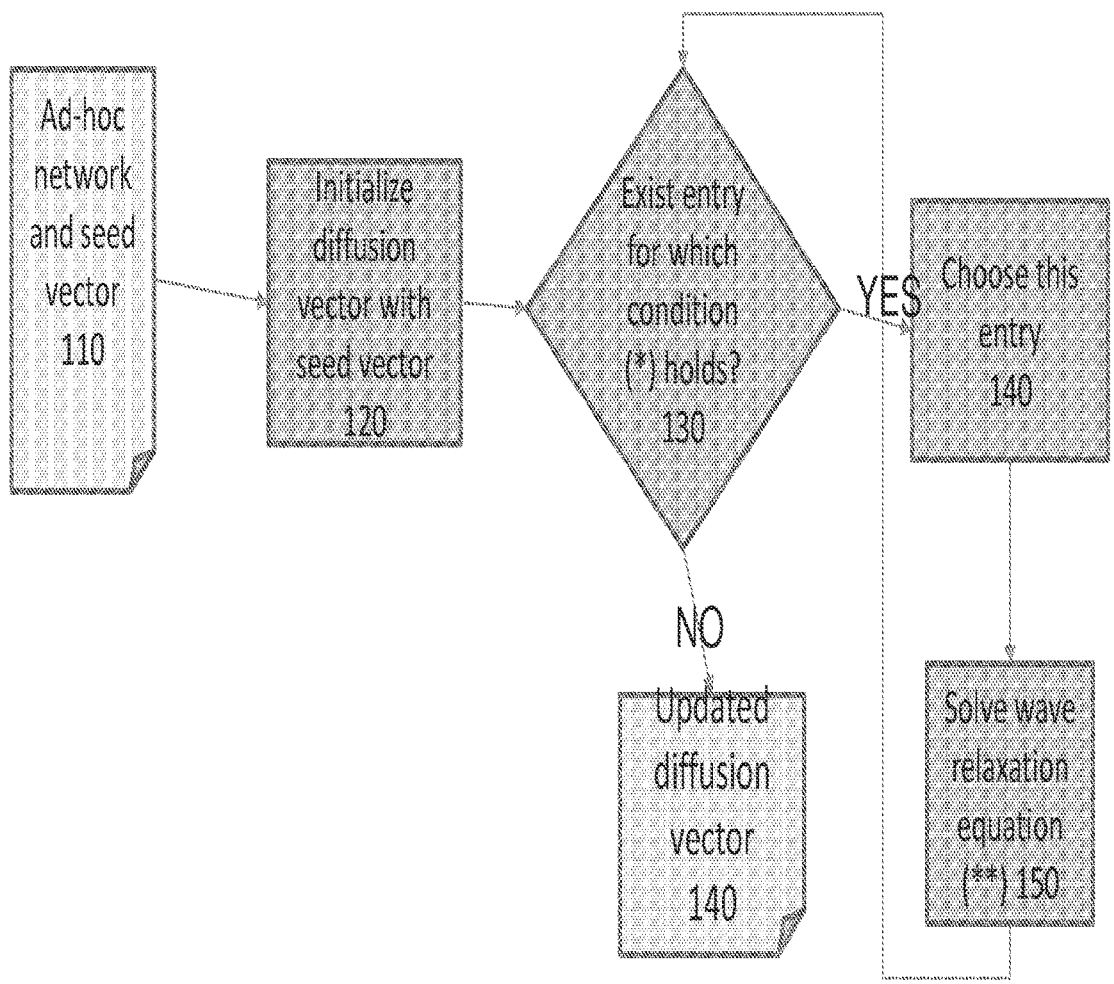
FIG. 1 illustrates a method for ad-hoc network waveform relaxation community detection in an example embodiment.

The invention will now be described with reference to the drawing figures, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

As a general background, the following example definitions are provided. A network graph includes a set of nodes connected via edges (links). An adjacency matrix includes the connections between the edges can be represented by an adjacency matrix. A community includes a set of nodes between which the interactions are (relatively) frequent, but are loosely connected to other (non-community) nodes. A seed includes a node in the network from which a community can be detected in an ad-hoc fashion. A degree includes number of edges incidenting a node. A local graph algorithm is an algorithm that operates only on a local part of the graph, where the size of the part accessed is proportional to the size of the output.

The classical graph diffusion vector is the Personalized PageRank vector, assume that A is the adjacency matrix, and D is a diagonal matrix of the degrees, then $P=A D^{-1}$ is defined to be a random walk transition matrix. The page Rank diffusion vector of a teleportation vector s, is given by:

$$p=(1-\alpha)(I_n-\alpha P)^{-1}s, \alpha \in (0,1).$$

Alternatively, a heat kernel diffusion vector can be considered:

$$h=\exp\{-(\gamma(I_n-P))\}s, \gamma>0$$

Another method includes time-dependent PageRank combines the two, but has not been used in the context of community detection. Local algorithms have been suggested for PageRank and Heat-Kernel.

However, these methods do not address the present needs of the industry. As mentioned above, there is a need to form ad-hoc communities on a network that is implicit and discovered on the fly. To enable effective orchestration of enterprise operations there is a need to detect efficiently localized ad-hoc communities on large implicit network that are dynamically discovered, coupled with the ability to steer the scale and diffusivity (tightness) of these communities.

An instance would be resolution of a problem with the computer or some piece of software, an employee may be referred to nearby employee using the same hardware/software as a first cheap and easy step. This could optimize IT (information technology) costs dramatically. Note, importantly, that the association between the employees is done implicitly by combining their profiles with the standard criterion of physical proximity. If an employee seeks the advice, or collaboration, of an expert from another domain, then such as expert can be searched for within the community. When an employee submits a query, e.g. searching for a document or asking for the definition of a given term, then relevant people—organized as a community—may be prompted to assist.

As these examples illustrate, and in line with many recent architectures, the disclosed invention unleashes a powerful mechanism for peer-to-peer communication without centralized control. A complementary aspect, of equal importance, is the ad-hoc nature of the community, in a network that is formed on the fly. User effort, in actively registering or maintaining his role in the network and his membership in the community, is reduced to zero. Also, the nature of the network and communities is dynamic and so they always consist of up-to-date and relevant members.

A system and method for the detection of localized communities (graph clustering) on an implicitly discovered graph using graph diffusion is provided. The system analyses a local graph in a local manner using a wave relaxation approach to solve an initial value problem. Starting with a seed (or multiple seeds) diffusion vector(s) is computed. The algorithm only queries nodes for the connections, and the computation stays local, so the network can be formed on-the-fly. The diffusion vector is reweighted based on the degrees. The diffusion vector can be obtained through solution of the initial value problem:

$$\frac{dx(t)}{dt} = (1-\alpha)s - (I_n - \alpha P) \times (t), x(0) = s, t \in \gamma.$$

The nodes are sorted based upon their magnitude in the reweighted diffusion vector. The community is detected through a sweep over the nodes according to their rank, selecting the prefix that minimizes (or maximizes) an objective function (such as conductance). For large scale graphs sparse approximation to the diffusion vector is found detailed enablement of the wave relaxation community detection process is given below.

In another example embodiment, the system can be used to rank association between web-pages (e.g., web search engine providing search), associates (e.g., LINKED-IN), or social media type applications. In another embodiment, the system can be integrated with recommender system, if several members have an overlapping set of attributes, for example set of skills relevant to a certain professional membership, they system can then use recommender system to suggest them other relevant professional membership.

Referring to FIG. 1, first information regarding an ad-hoc network and seed vector (or seed vectors) is provided (Step 110). Then the seed vector initializes a diffusion vector (step 120). Then, there is a determination whether there exists an entry for which the following condition holds:

$$\left\| \alpha \sum_{j=1}^{n} P_{ij} y_j(\cdot) + (1-\alpha)(s)_i - y_i(\cdot) - y_i'(\cdot) \right\|_\infty \geq \frac{(1-\alpha)d_i \epsilon}{1 - \exp((\alpha - 1)\gamma)}$$

If the answer is no for step 130, then the diffusion vector is updated in step 140. Otherwise, if the answer is yes in step 130, then it is determined that an entry is to be chosen (step 150). Then, solve the following wave relation equation:

$$y'(t) = -y(t) + \alpha \sum_{j=1}^{n} P_{ij} y_j(t) + (1-\alpha)s_i, \ y(0) = s_i$$

Concerning the algorithms scalars are denoted using Greek letters or using t, s, . . . . Vectors are denoted by x, y, . . . and matrices by A, B, . . . . The convention that vectors are column-vectors is used. The vector-valued functions from [0, denotes their evaluation (which is a vector in $\mathbb{R}^n$) at a specific point t. Accordingly, $x(\cdot); y(\cdot) \ldots$ denote scalar-valued functions, and x(t), y(t), . . . their evaluation at t. For a vector (or vector-valued function), lower case letter with an index denotes the value of coordinate i of the vector (resp. vector-valued function). For example, $x_i$ (resp. $x_i(\cdot)$) denotes the i-th entry of x (resp. $x(\cdot)$). Note that $x_i$ is different from $x_i$; the former is a scalar, while the latter is a vector indexed by i.

The result of the wave relation equation is then sent back to step 130.

Concerning the diffusion coefficient the following is provided. Since both PageRank and heat kernel are a special cases of the proposed time-dependent PageRank, any rigorous theoretical guarantee on either one can be mimicked using the time dependent PageRank. Consequently, potentially some non-degenerate combinations of $\alpha$ and $\gamma$ will offer better results. While there is no rigorous analysis supporting this assessment, inspection of diffusion coefficients can provide insight into possibly favorable behaviors of time dependent PageRank.

Graph diffusion vectors, like PageRank and heat kernel, can be written as an infinite series:

$$f = \sum_{k=0}^{\infty} a_k P^k s$$

Where the following is true:
$\Sigma_{k=0}^{\infty} \alpha_k = 1$.

The terms $a_k$ are the diffusion coefficients, s which serve as weights to the distribution of random walks of the corresponding lengths.

For PageRank, the diffusion expansion is:

$$p = (1-\alpha) \sum_{k=0}^{\infty} \alpha^k P^k s,$$

and for the heat kernel it is:

$$h = e^{-\gamma} \sum_{k=0}^{\infty} \frac{\gamma^k}{k!} P^k s$$

Therefore, the following holds:

$$x = \sum_{k=0}^{\infty} \left[ (1-\alpha)\alpha^k \left(1 - e^{-\gamma} \sum_{r=0}^{k} \frac{\gamma^r}{r!}\right) + e^{-\gamma} \frac{\alpha^k \gamma^k}{k!} \right] P^k s$$

The diffusion coefficients of PageRank decay at a fixed rate. Thus, if the decay for low-indices is slow (i.e. short paths have roughly the same coefficient), the decay is very slow overall, and excessively long paths will have rather high coefficients, thereby encouraging large communities. Slow decay also poses an algorithmic challenge, since the algorithm needs to allocate significant weights to very long paths. As for the heat kernel, while the coefficients eventually decay to zero very quickly, there is an initial phase in which they actually grow (this is because k! is independent of $\gamma$, and thus $\gamma^k$ initially grows much faster than k!). Thus, the coefficients of the heat kernel display a hump in the lower coefficients, which might cause short paths to get very small weight. Once the cumulative sum gets very close to 1.0, the weights of remaining long paths are too small for them to affect the final diffusion vector.

Figure 2:
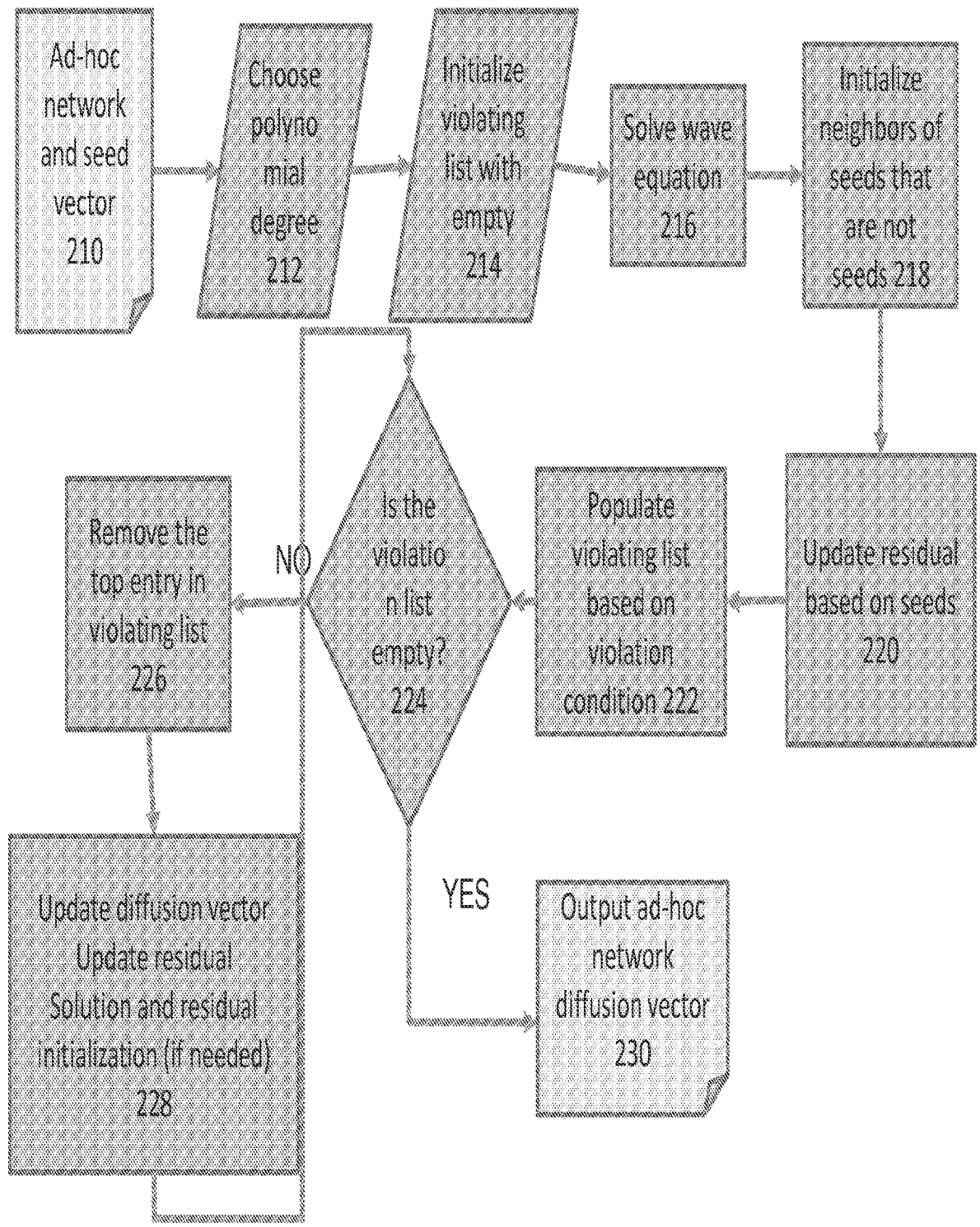
FIG. 2 illustrates another example embodiment for ad-hoc network waveform relaxation community detection.

FIG. 2 illustrates another example embodiment for ad-hoc network waveform relaxation community detection.

Referring to FIG. 2, in another example embodiment, first an ad-hoc network and seed vector is provided (step 210). Then, the polynomial degree is selected in step 212. Thereafter, there is an initializing of a violating list with empty (step 214). Then, the wave equation is solved (step 216). Thereafter, there an initializing of neighbors of seeds that are not seeds (step 218). Then, there is an updating of residual based on the seeds (step 220). Thereafter, there is populating a violating list based on violating condition (step 222).

Then after populating the violating list (step 222), a determination is made whether the violation list is empty (step 224). If the violation list is empty 224, then there an outputting of an ad-hoc network diffusion vector (step 230). On the other hand, if no violation list is empty (step 224), then there is a removal of the top entry in the violation list (step 226). Thereafter, there is an updating of the diffusion vector update residual solution and residual initialization (if needed) (step 228). Thereafter step 228, a determination is made whether the violation list is empty (step 224) again.

Relaxation is a general technique for solving linear equations of the form Ax=b. In the most general form, the matrix is split $A=B_k-C_k$ (here k is an iteration index), and the iteration is written as $x(k+1)=B-1, C_k x^{(k)}+b$).

By carefully choosing $B_k$ and $C_k$, one can ensure that x(k+1) is identical to x(k) in all but one coordinate. Such methods are called coordinate relaxation methods, and they are closely related to the Gauss-Seidel and Gauss-Southwell iteration.

diffusion-based community detection algorithms start by computing a diffusion vector, which is used rank the vertices and perform a sweep. Our goal is to integrate the time-dependent personalized PageRank vector in this framework, instead of the personalized PageRank vector or the heat kernel vector. This section describes our algorithm for computing.

The exact time-dependent personalized PageRank vector is completely dense for connected graphs. Computing it exactly is too expensive for the purpose of detecting local communities. It is common practice to find approximate vectors that are localized (i.e., have only a small number of non-zeros). Since the main purpose of the diffusion vector is to form a ranking of the nodes by sorting their degree reweighted diffusion values, a natural objective is to seek an approximate diffusion vector y such that $$\|D^{-1}(x-y)\|_\infty < \epsilon.$$

The algorithm constructs a vector-valued function that approximates the diffusion vector for all $t \in [0, \gamma]$. That is, the algorithm constructs a vector function $y(\cdot)$ such that $\|D^1(x(t)-y(t))\|_\infty < \epsilon$.

for all $t \in [0, \gamma]$. In the above $x(\cdot)$ is the solution to (1).

Figure 3:
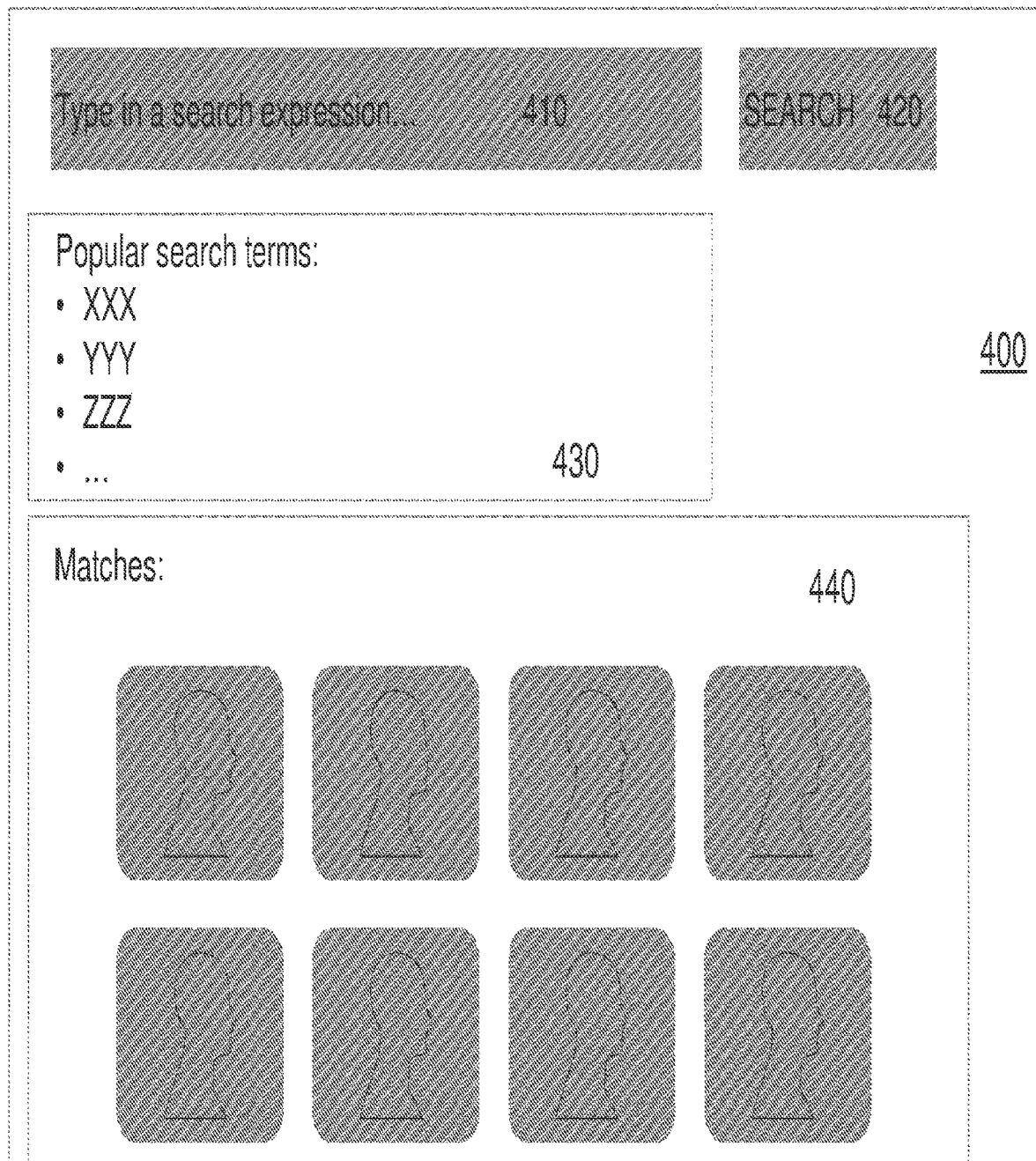
FIG. 3 illustrates search results in an example embodiment.

FIG. 3 illustrates search results in an example embodiment. In a cloud computing system or computer device 400, a user can type in a search expression 410 via an input device, a search is performed 420 to generate popular search terms 430 and matches 440 provided using the example embodiments in FIGS. 1 and 2.

Exemplary Hardware and Cloud Implementation

Figure 4:
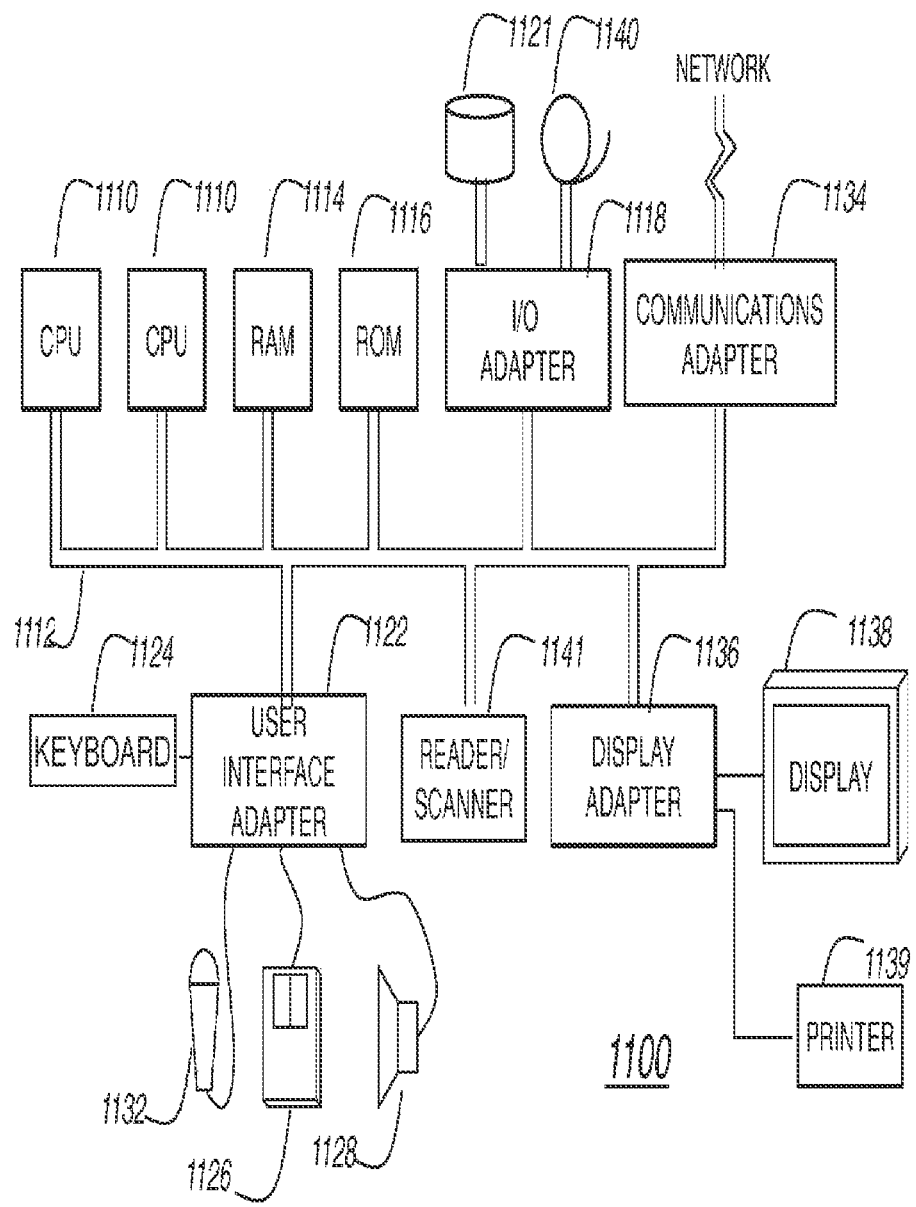
FIG. 4 illustrates an exemplary hardware/information handling system for incorporating the exemplary embodiment of the invention therein.

FIG. 4 illustrates another hardware configuration of an information handling/computer system 1100 in accordance with the disclosed invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Figure 5:
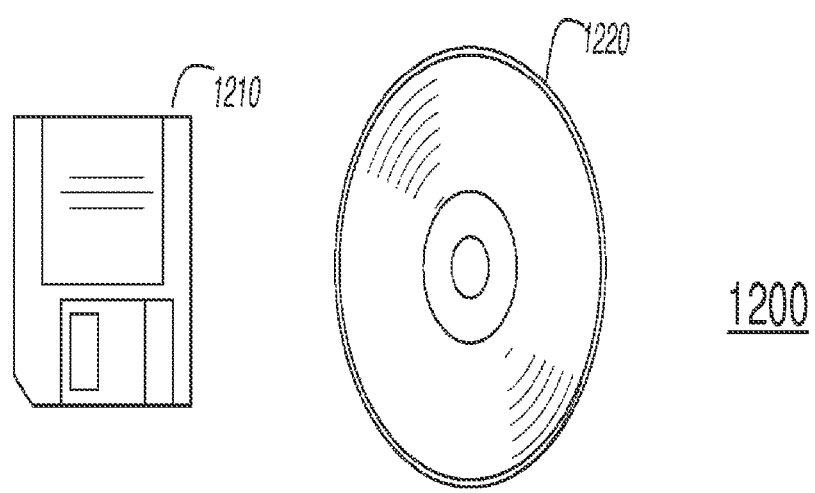
FIG. 5 illustrates a signal-bearing storage medium for storing machine-readable instructions of a program that implements the method according to the exemplary embodiment of the invention.

Alternatively, the instructions may be contained in another signal-bearing storage media 1200, such as a magnetic data storage diskette 1210 or optical storage diskette 1220 (FIG. 5), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
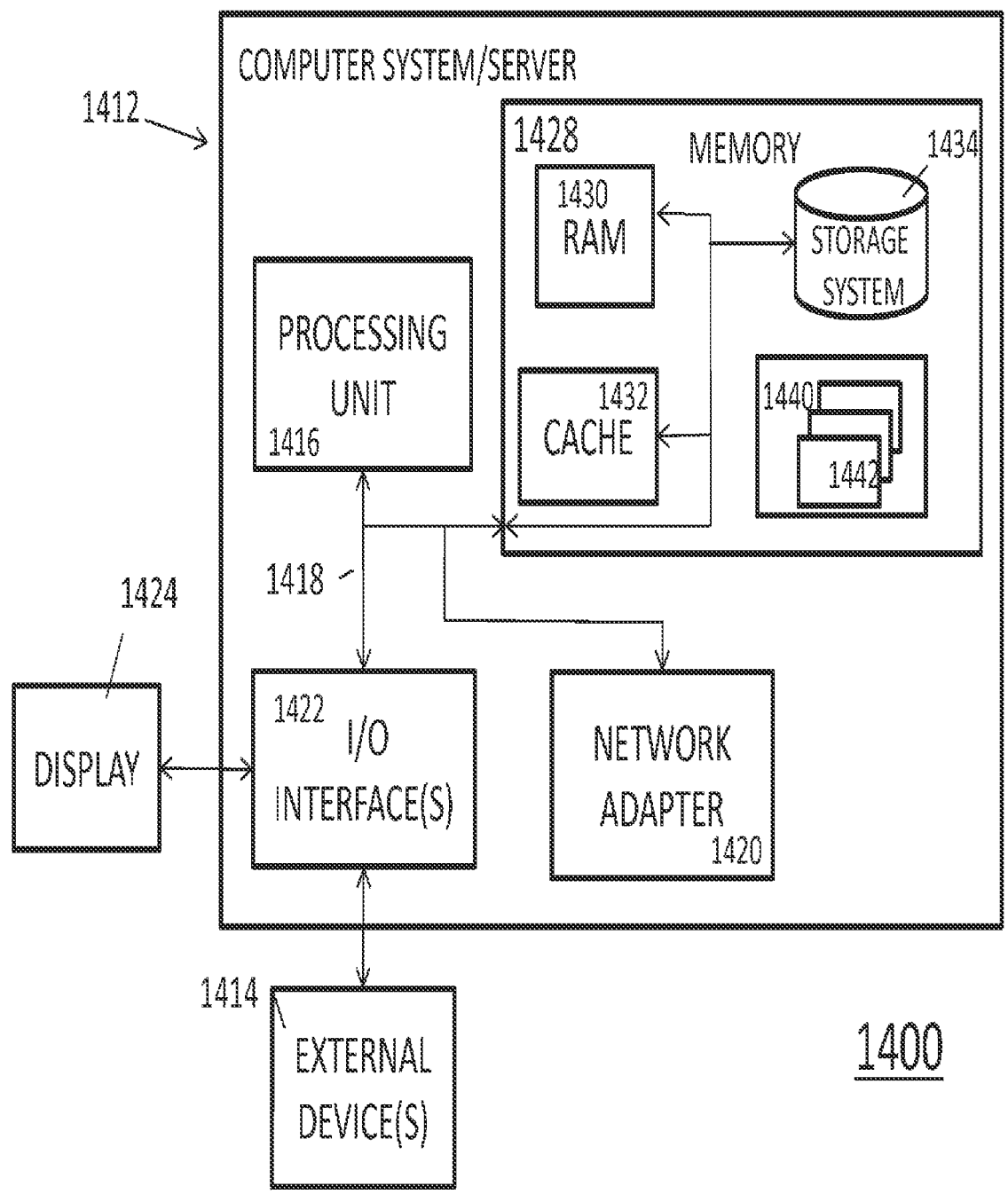
FIG. 6 depicts a cloud computing node according to an embodiment of the present invention.

Referring now to FIG. 6, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 7:
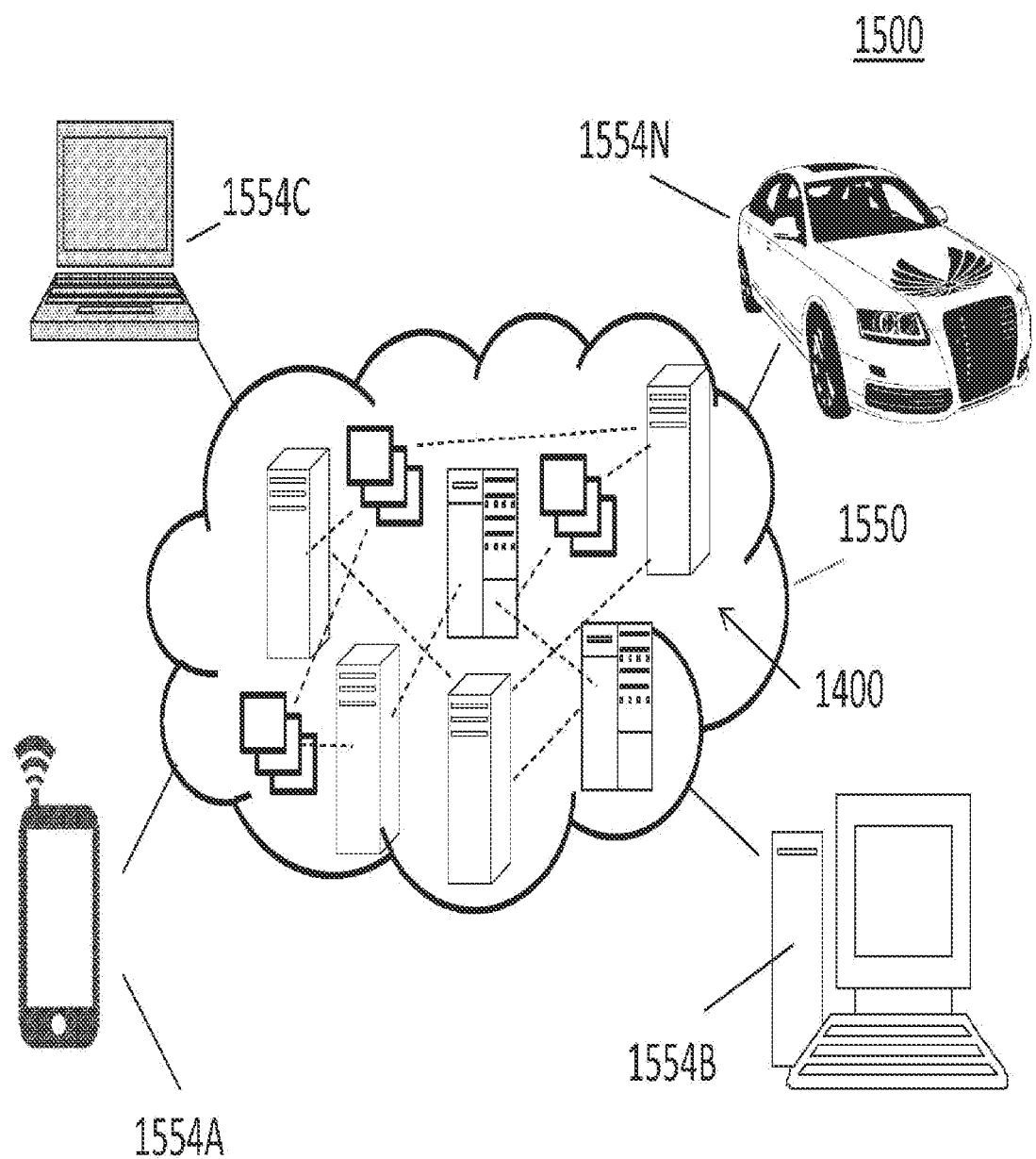
FIG. 7 depicts a cloud computing environment according to an embodiment of the present invention.

Referring now to FIG. 7, illustrative cloud computing environment 1550 is depicted. As shown, cloud computing environment 1550 comprises one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 7 are intended to be illustrative only and that computing nodes 1400 and cloud computing environment 1550 can communicate with any type of computerized device over any type of network and/or network addressable connection (e.g., using a web browser).

Figure 8:
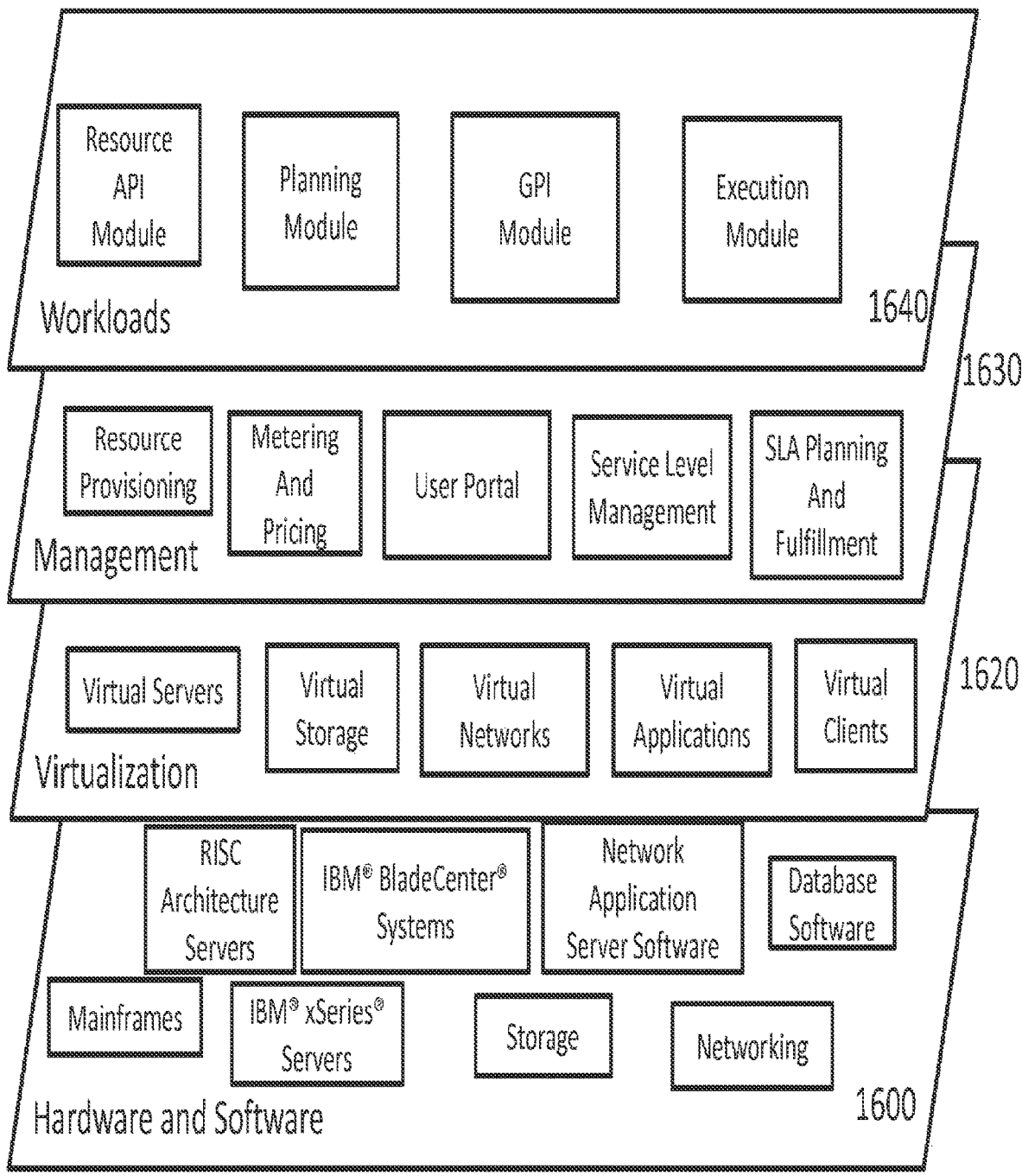
FIG. 8 depicts abstraction model layers according to an embodiment of the present invention.

Referring now to FIG. 8, a set of functional abstraction layers provided by cloud computing environment 1550 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the disclosed invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of discovering communities, comprising:
computing a diffusion vector by a processor including weights that starts with a seed;
querying nodes of networks for connections;
reweighting the diffusion vector;
sorting the nodes based upon at least a magnitude in the reweighted diffusion vector;
detecting a community over the networks in an ad-hoc manner by at least sweeping over the nodes according to their rank by the processor in a computer through wave relaxation,
wherein the detecting the community includes controlling a predetermined condition of the community; and
discovering ad-hoc communities over implicit networks by wave relaxation,
wherein the detecting of the ad-hoc communities includes controlling a predetermined tightness of a local community that is found.

2. The method according to claim 1, wherein the community is detected using a wave relaxation algorithm, and the computing of the diffusion vector starts with a seed, and
further comprising selecting a prefix that minimizes or maximizes an objective function; ranking association between web-pages, associates, or social media type applications; and
discovering ad-hoc communities over the networks,
wherein the detecting includes diffusion-based community detection algorithm or a wave relaxation algorithm querying the nodes for connections, and where computation is localized,
wherein a recommender system is added for a set of skills relevant to a predetermined membership,
wherein the detecting the community includes controlling the predetermined condition of the community based on a graph of the network.

3. The method according to claim 1, further comprising:
ranking association between web-pages, associates, or social media type applications; and
integrating with a recommender system, if several members have an overlapping set of attributes, for a set of skills relevant to a predetermined membership,
wherein an algorithm queries the nodes for connections, and computation is localized, and
wherein the detecting includes diffusion-based community detection algorithm.

4. The method according to claim 1, further comprising:
integrating with a recommender system, if several members have an overlapping set of attributes, for a set of skills relevant to a predetermined membership, and
discovering ad-hoc communities includes controlling a predetermined tightness of a local community.

5. The method according to claim 1, wherein the diffusion vector is determined through a predetermined initial value problem,
wherein the diffusion vector is locally determined, and
wherein an algorithm constructs a vector valued function that approximates the diffusion vector.

6. The method according to claim 1, further comprising: discovering ad-hoc communities over networks;
wherein the detecting of the ad-hoc communities includes controlling a community,
wherein a seed vector initializes a diffusion vector,
wherein the detecting of the community is based on a graph of the networks.

7. A system, comprising:
a server comprising:
a processor; and
a computer readable medium storing a program executed by the processor,
wherein the server computes a diffusion vector including weights that starts with a seed,
wherein the server querying nodes of networks for connections,
wherein the server reweights the diffusion vector,
wherein the server sorts nodes based upon magnitude in the reweighted diffusion vector, and
wherein the server detects, by the processor, a community over the networks in an ad-hoc manner by sweeping over the nodes according to their rank,
wherein the server discovers ad-hoc communities over implicit networks by wave relaxation,
further comprising:
integrating with a recommender system, if several members have an overlapping set of attributes, for a set of skills relevant to a predetermined membership, and
discovering ad-hoc communities includes controlling a predetermined tightness of a local community.

8. The system according to claim 7, further comprising:
discovering ad-hoc communities over the networks,
wherein the community is detected using a wave relaxation algorithm,
wherein the server computes the diffusion vector starting with a seed, and
wherein the server selects a prefix that minimizes or maximizes an objective function,
wherein the server detects the community includes controlling a predetermined condition of the community based on a graph of the network.

9. The system according to claim 7, further comprising:
the server ranking association between web-pages, associates, or social media type applications, and
wherein the server detects the community over the networks in the ad-hoc manner by sweeping over the nodes according to their rank by the processor in the server through wave relaxation.

10. The system according to claim 7, further comprising of integrating with a recommender system, if several members have an overlapping set of attributes, for a set of skills relevant to a predetermined membership.

11. The system according to claim 7, wherein the diffusion vector is determined by the server through a predetermined initial value problem, and
wherein the diffusion vector is locally determined within the server.

12. The system according to claim 7, wherein a seed vector initializes a diffusion vector by the server.

13. The system according to claim 7, wherein the server discovers ad-hoc communities over implicit networks by wave relaxation.

14. The system according to claim 7, wherein the server comprises a cloud-based implementation.

15. A server, comprising:
a processor; and
a computer readable medium storing a program executed by the processor,
wherein the server computes a diffusion vector including weights that starts with a seed,
  wherein the processor querying nodes of networks for connections,
  wherein the processor reweights the diffusion vector,
  wherein the processor sorts nodes based upon a magnitude in the reweighted diffusion vector,
  wherein the processor detects a community over the networks by sweeping over the nodes according to their rank according to the program stored on the computer readable medium,
  wherein the server discovers ad-hoc communities over implicit networks by wave relaxation, and
  wherein the server comprises a cloud-based implementation, and
  wherein the discovering ad-hoc communities includes controlling a predetermined tightness of a local community that is found.

16. The server according to claim 15, further comprising:
discovering ad-hoc communities over the networks,
  wherein the discovering of the ad-hoc communities includes controlling a community,
  wherein the community is detected by the processor using a wave relaxation algorithm,
  wherein the processor computes the diffusion vector starting with a seed,
  wherein the processor selects a prefix that minimizes or maximizes an objective function, and
  wherein the processor detects the community includes controlling a predetermined condition of the community based on a graph of the network.

17. The server according to claim 15, further comprising integrating with a recommender system, when at least one member has an overlapping set of attributes, for a set of skills relevant to a predetermined membership; and
  wherein the processor ranks association between webpages, associates, or social media type applications.

18. The server according to claim 15, wherein the processor integrates with a recommender system, if several members have an overlapping set of attributes, for a set of skills relevant to a predetermined membership,
  wherein the diffusion vector is determined by the processor through a predetermined initial value problem, and
  wherein the diffusion vector is locally determined within the server.

* * * * *